United States Patent [19]

Takenaka

[11] 4,039,297

[45] Aug. 2, 1977

[54] HEAT INSULATING PARTICLES

[75] Inventor: Yasuo Takenaka, Hino, Japan

[73] Assignee: Japanese National Railways, Tokyo, Japan

[21] Appl. No.: 567,103

[22] Filed: Apr. 11, 1975

Related U.S. Application Data

[63] Continuation-in-part of Ser. No. 318,654, Dec. 26, 1972, abandoned.

[30] Foreign Application Priority Data

Dec. 25, 1971  Japan .............................. 46-105197

[51] Int. Cl.$^2$ ........................... B22F 3/10; B32B 5/16; B22F 7/00
[52] U.S. Cl. .............................. 428/566; 220/9 LG; 220/9 C; 428/69; 428/198; 428/309; 428/215; 428/403; 428/404; 428/406; 428/407; 52/404; 75/230; 428/570; 428/923
[58] Field of Search ............... 428/403, 407, 323, 215, 428/327, 328, 329, 406, 309, 331, 404, 69, 198; 52/404; 29/191, 191.2, 191.4, 192 R, 182.5, 182; 220/9 LG, 9 C

[56] References Cited

U.S. PATENT DOCUMENTS

| 2,023,204 | 12/1935 | Munters | 428/407 |
|---|---|---|---|
| 2,939,804 | 6/1960 | Schossberger | 428/407 |
| 2,985,411 | 5/1961 | Madden | 29/191 |
| 3,031,046 | 4/1962 | Hoadley | 428/309 |
| 3,069,301 | 12/1962 | Buckley | 428/434 |
| 3,135,044 | 6/1964 | Mote | 29/191.2 |
| 3,264,073 | 8/1966 | Schmitt | 427/215 |
| 3,427,139 | 2/1969 | Gregory | 29/191 |
| 3,442,690 | 5/1969 | Peake | 428/404 |
| 3,533,824 | 10/1970 | Terrill | 428/404 |
| 3,573,954 | 4/1971 | Yamamoto | 428/404 |
| 3,607,169 | 9/1971 | Coxe | 65/21 |
| 3,769,770 | 11/1973 | Deschamps | 428/403 |

OTHER PUBLICATIONS

John Perry "Chemical Engineers' Handbook", pp. 21-51, 4th Edition.

Primary Examiner—Ellis Robinson
Attorney, Agent, or Firm—Armstrong, Nikaido & Marmelstein

[57] ABSTRACT

The present invention relates to improved heat insulating particles with a high heat insulating effect and high mechanical strength. The particles are smooth cells formed around hollow or solid grains of a low heat-conducting material such as silica, alumina, glass, or a synthetic resin like nylon or teflon, which are coated with a material that can readily reflect the heat radiation such as aluminum, copper, gold, silver, stainless steel or titanium. The cells thus-formed are bound together by sintering in the form of a block or any other desirable shape so that the metallic surface cells are bonded together at their points of contact through molecular dispersion of the metal molecules of the respective surfaces.

5 Claims, 13 Drawing Figures

HEAT INSULATING PARTICLES

BACKGROUND OF THE INVENTION

This application is a continuation-in-part of application Ser. No. 318,654, filed Dec. 26, 1972, now abandoned.

The present invention relates to heat insulating particles satisfying desirable heat insulating conditions in terms of three factors: gas molecular heat conduction, heat radiation and solid heat conduction, and also a heat insulator meeting at the same time the three conditions for important enhancing heat insulating effects, i.e., gas molecular heat conduction, heat radiation and solid heat conduction, and further characterized by high mechanical strength.

As described later referred to FIG. 1, gas molecular heat conduction, heat radiation and solid heat conduction are generally recognized as the more important factors for enhancing heat insulating effects.

The conventional heat insulators of this kind are intended for only heat insulation and attention has been paid solely to use of a low heat conducting material. Thus, such insulators, when applied to a structure or device, permit large amounts of heat to invade the structure or device from adjacent parts and, as the result, the overall heat insulating effects obtained are found insufficient. For instance, in the case of heat insulation at cryogenic temperatures, good overall heat insulating effects, which depend largely upon the design and structure of the device, cannot always be assured even if a heat insulating material of however low heat conductivity is adopted.

The most simple means of heat insulation applied at present in this field is by using foamed materials. They include glass foam, polyethylene foam, isocyanate foam, etc. As the foaming gas, carbon dioxide is commonly used. It is common practice to heat the crude material, i.e., glass, polyethylene or isocyanate to a high temperature, transform it into a liquid foam by means of carbon dioxide gas and then stop the heating. These liquid foams solidify at about 190° K and thus a foamed product is obtained. This kind of foamed product is less likely to have through blow holes formed therein and accordingly the heat conduction by gas molecules is extremely low therein. The main factors of heat conduction therein are solid heat conduction of the foam and heat radiation. Therefore, the apparent average heat conductivity is relatively low. However, in the case of the outer wall being exposed to the atmosphere or depending on the ambient pressure or the surrounding atmosphere, the foaming gases contained in the foamed product may easily diffuse. When these gases replace the air of atmospheric gas, they may contaminate the atmosphere or may lower the heat insulating effect. This problem can be mitigated by employing the high vacuum approach in which molecular heat conduction of the residual gas depends on the kind and pressure of the residual gas in the heat insulating layer. However, to be so effective as to be able to ignore the heat input from the residual gas, the vacuum has to be as high as below $10^{-6}$ mm Hg. If heat insulating properties are to be further improved, some contrivance must be made to reduce heat radiation and solid heat conduction. Heat radiation is said to be independent of the degree of vacuum and to depend on the fourth power difference in temperature between the inner and outer surfaces of the heat insulating layer, the properties of the wall materials and the finish of the surfaces. Various methods are available for prevention of heat radiation, but as a matter of fact they are not fully effective, because in structures or devices using heat insulators of this kind, solid heat conduction from supporting and other structural members usually accounts for over 50% of the total heat transfer. Thus, high vacuum heat insulation is considered unfit for large-size heat insulating systems.

The use of normal heat insulating porous particles fully occupying a heat insulating space at normal pressure has the merit that the apparent average heat conductivity is approximately equal to the heat conduction of residual gases between particles. Heat convection is suppressed although heat conduction through the particles may take place to some extent. When the pressure in the heat insulating space is reduced enough to bring the average free travel length of gas molecules closer to a value comparable to the gap between particles, the apparent heat conductivity of the particles takes a sudden drop and at pressures less than $10^{-3}$ mm Hg. the heat insulating effect obtained is about equal to that of the high vacuum method. Although porous particles are commonly adopted as heat insulating materials, their combined heat conductivity is more often dependent upon the characteristics of the particles which are expressed by the kind, shape, arrangement, thickness, density, temperature, heat capacity, reflectivity, absorption coefficient of the particles, the surface adaptability of the particles to gas and other functions. Besides, these particles usually lack in the ability to shield heat radiation.

The so-called cooling pipe heat insulation method, in which a heat insulating layer existing between inner and outer vessels is internally provided with a cooling pipe which circulates an evaporation gas as the cooling agent, may give better heat insulation, but still has a number of drawbacks, e.g., complexity of structure, consumption of cooling agent that cannot be neglected, increased size of the equipment as a whole, and various difficulties of installation.

As compared with the other methods mentioned above, the so-called multi-layer heat insulation method with insertion of a multi-layer radiation shield is the best one, but in this method the heat insulating effect widely varies depending on the clamping tightness of the units constituting the multilayer. Since the units have to be clamped as loosely as possible for a better heat insulation, the mechanical strength of the heat insulator as a whole drops and this multi-layer insulator is found inappropriate for use as a supporting or other constituent member of a structure or a device.

On the other hand, stainless steels or synthetic resins with low heat conductivity are available as heat insulating materials which combine the ability to become a supporting or other constituent member of a structure or a device but they are subject to considerable heat flow by means of solid heat conduction.

SUMMARY OF THE INVENTION

One embodiment of the invention relates to a heat insulator comprising a plurality of smooth heat insulating particles each having a hollow or solid center grain of a low heat conducting material and coated thereon a material selected to reflect radiation heat incident thereupon. Preferably, said low heat conducting material is silica, alumina, glass, or a synthetic resin and said material selected to reflect radiation heat is aluminum, copper, gold, silver, stainless steel or titanium. These particles are bound together by sintering so that the molecules of the outer metallic surfaces of each particle at the points where they respectively make point contact with one another are actually interdispersed to form a bond.

Another aspect of the invention provides for a heat insulator comprising a plurality of substantially spherical, smooth heat insulating particles each having a substantially spherical center grain of about −0.01 mm to about 1.2 mm in diameter of a material having a heat conductivity of less than about $1 \times 10^4$ microwatts/cm°k and coated thereon at a thickness of about $0.1\mu$ to about $1.2\mu$ a material having an emittance value greater than about 0.02 at 300°k. Preferably, each center grain is a solid center grain of about 0.1 to about 1.2 mm in diameter and the coating has a thickness of about 0.1 to about $1.2\mu$. According to another embodiment, each center grain is a hollow center grain having an outside diameter of about 0.1 to about 1.2 mm. Preferably, the wall thickness of the hollow center grain is about 3 to $200\mu$ and the coating has a thickness of about 0.1 to $0.2\mu$. Each center grain is preferably silica, alumina, glass, or a synthetic resin, such as nylon or teflon while the coating is aluminum, copper, gold, silver, stainless steel or titanium. The metallic coating of said particles are adhered together through sintering so that the outer surfaces of adjoining particles are in point contact. In further aspects of the invention, the adhered particles form a plurality of block-like members which are arranged at intervals separated by vacuum spaces or spaces containing carbonic acid gas.

Another feature of the invention is directed to a method for making a hollow heat insulator particle comprising a spherical-shaped member of a material readily disassociated at low temperatures, coating said member with a material having a low heat conductivity, coating the low heat conductivity material with a material selected to reflect radiation heat incident thereon and heat the resultant composite to a temperature sufficient to disassociate the spherical-shaped member. Preferably, said spherical-shaped member is foamed polystyrene. In this case the method advantageously further comprises cooling the heated composite to a sufficiently low temperature to freeze the carbonic acid gas remaining from disassociating the foamed polystyrene. Preferably, said sufficiently low temperature is below about 190° K.

BRIEF DESCRIPTION OF THE DRAWINGS

FIG. 5b is a plan view of the vacuum vapor deposition apparatus illustrated in FIG. 5a.

FIG. 5c is a sectional view of 5c—5c of the vacuum vapor deposition apparatus illustrated in FIG 5a.

FIG. 6a is a perspective view of a partial section of a tank car in which the coated heat insulating particles of the present invention are applied.

FIG. 6b is a partial sectional view illustrating a mode of fitting the heat insulating particles of FIG. 6a.

FIG. 7 is a sectional view of an experimental apparatus employed for experiments of the present invention.

DETAILED DESCRIPTION

When the heat insulating effect of a heat insulator in general is considered, gas molecular heat conduction, heat radiation and solid heat conduction are usually found to be the most important factors. To emphasize and exemplify this point, reference is made to FIG. 1, which shows a longitudinal section of a so-called metal Dewar flask 1. In FIG. 1, $T_2$ is the outside temperature of the metal Dewar flask 1; $T_1$ is the temperature of inside sphere 2, which holds, say, liquefied helium H; Q indicates a heat insulating layer interposed between inside sphere 2 and outside sphere 2', said heat insulating layer being, for example, a high vacuum layer; 3 is the neck pipe of, e.g., a metal or the like; and 4 is the support layer constituting the bottom.

Under such arrangement the following are commonly mentioned as the factors causing a penetration of the external temperature $T_2$ into the walls of the inside sphere;

1. heat conduction through the gas molecules remaining in heat insulating layer Q between temperatures $T_2$ and $T_1$;

2. radiation of temperature $T_2$ from the internal surface of the outside sphere;

3. solid heat conduction taking place through the metal of neck pipe 3;

4. heat radiation from outside through metal support 4; and 5. heat conduction by convection of the evaporation gas remaining on the inside surface of neck pipe 3 and within inside sphere 2.

Figure 1:
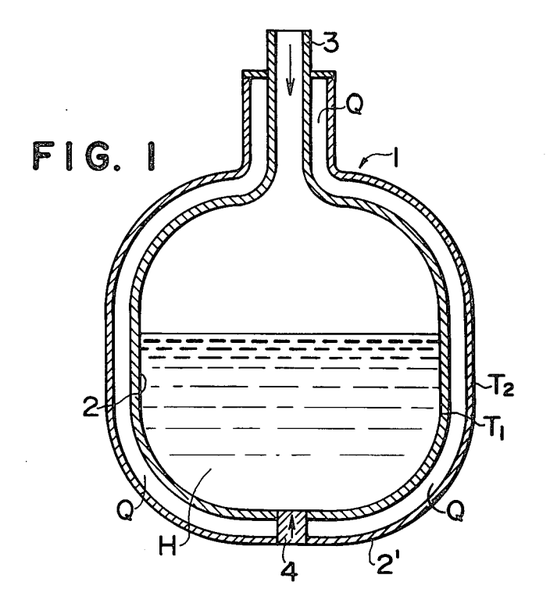
FIG. 1 is a sectional view of a well-known metal Dewar flask which is given to illustrate the phenomena regarded as the most important factors to improve the heat insulating effect of a heater insulator, i.e., gas molecular heat conduction, heat radiation and solid heat radiation.

However, heat conduction through convection of the evaporation gas in the heat insulating layer as illustrated in FIG. 1 accounts for an insignificant portion in the total heat input and thus the items (1) to (4), i.e., gas molecular heat conduction, heat radiation and solid heat conduction are regarded as the three most important factors in discussion of the heat insulating effect. For this reason, a heat insulator in which said three modes of heat conduction can be minimized is desirable. Such an insulator is formed by the heat insulating particles of the invention as described hereinafter referring to FIGS. 2a to 7.

Figure 2A:
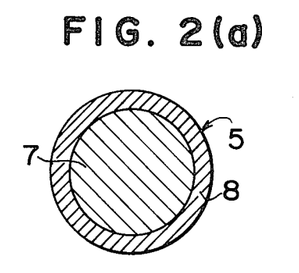
FIGS. 2a and b are respectively an enlarged view of a solid particle of the heat insulating particles according to the present invention and an enlarged view of a hollow particle of the heat insulating particles according to the present invention.

FIG. 2a illustrates solid particle 5, which represents a solid grain 7 of a low heat conducting material such as silica, alumina, glass, or a synthetic resin like nylon or teflon, whose outer surface carries smooth coating 8 of a material that can effectively reflect the radiation heat such as aluminum, copper, gold, silver, stainless steel or titanium. Generally speaking, the low heat conducting material used should preferably be one with a heat conductivity of less than $1 \times 10^4$ microwatts/cm°k to ensure the effect of the present invention; and the material to reflect the radiation heat should preferably be one with a radiation of greater than an emittance value of 0.02 at 300 k. In one example of manufacturing solid grains of, preferably, 0.10 mm to 1.2 mm diameter using the above-mentioned material with low heat conductivity, a hot solution of the above-mentioned low heat conducting material is ejected as a spray into a cooling bath through a sprayer in the prior art to solidify it into solid grains through quenching and the solid grains thus produced are sorted out in accordance with their diameters into groups with uniform diameters.

Figure 5A:
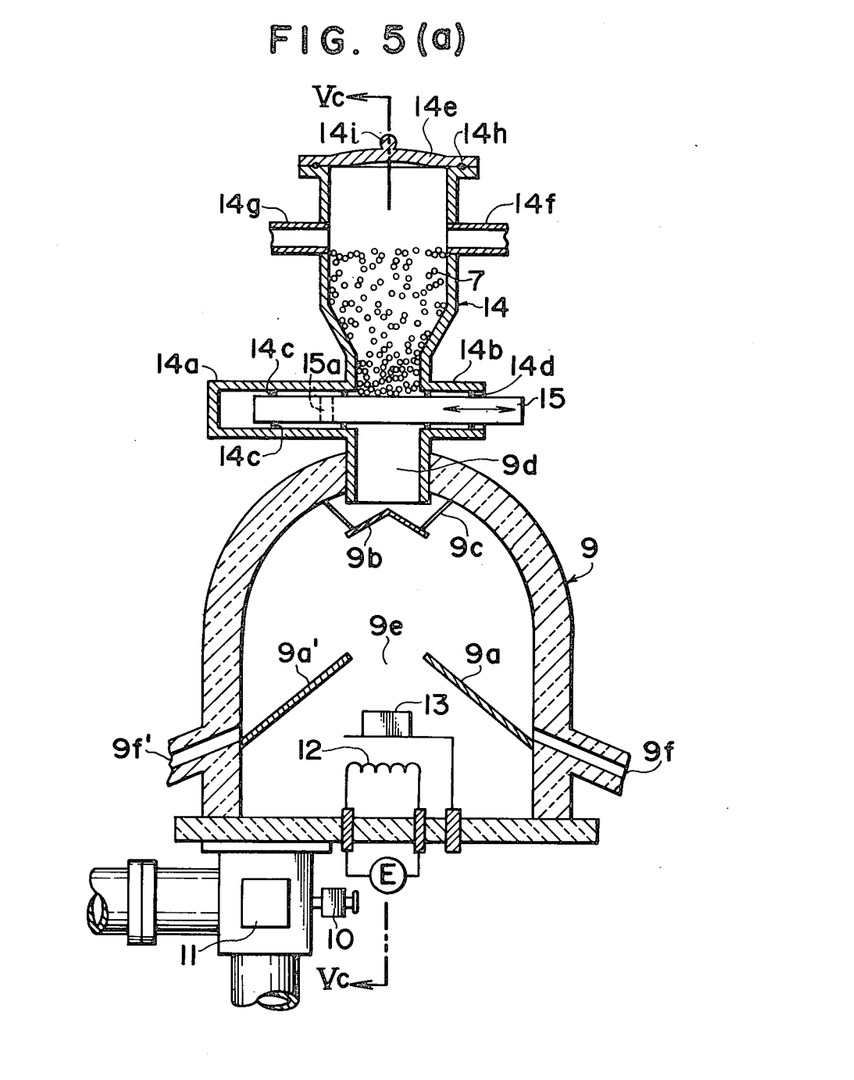
FIG. 5a is a front elevation view of a partial section of the vacuum vapor deposition apparatus preferably employed for externally coating hollow grains or solid grains in accordance with the present invention.
Figure 5B:
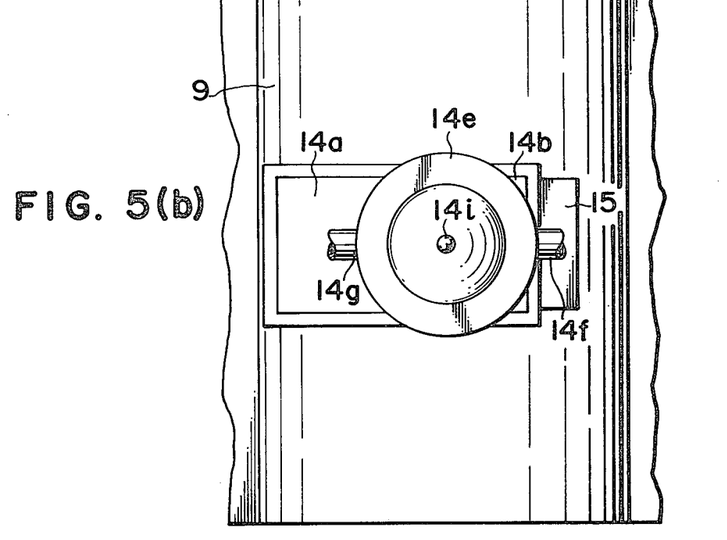
Figure 5C:
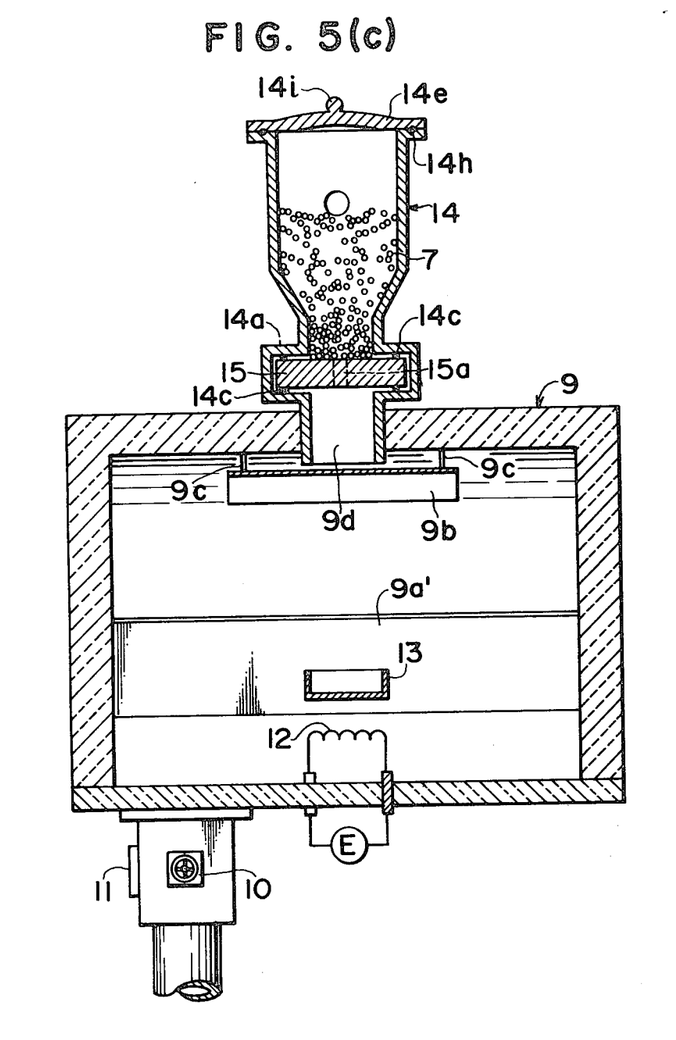

For the purpose of externally coating the grains thus obtained with a layer of the above-mentioned material that can effectively reflect the radiation heat, the method of the prior art as illustrated in FIGS. 5a–c may be employed.

In FIGS. 5a–c, 9 refers to the vapor deposition chamber. At middle bottom of the vapor deposition chamber 9, there is fitted a heater-like filament 12. Said heater 12 being connected to the power source E. Above this heater 12, comes the vessel 13 to hold an element to be vaporized. Inclined plates 9a, 9a' are provided above both ends of said vessel 13. The opposed end faces of said inclined plates 9a, 9a' are separated by a certain gap 9e, while their other end faces fixed to the whole length of the opposed internal surfaces of the vapor deposition chamber 9. Said gap 9e separating the opposed end faces of said inclined plates 9a, 9a' is nearly equal to or slightly greater than the longitudinal width of the top surface of said vessel 13. Said gap 9e is located on a plane nearly vertical to the top surface of said vessel 13.

An inverted-V guide 9b is provided over said gap 9e. Said inverted-V guide 9b links via a fine wire 9c to the opposed inside wall of the vapor deposition chamber 9. Said inverted-V guide 9b, when viewed from above, looks in shape and position to cover said gap 9e. The opposed wall of the vapor deposition chamber 9, which is located a certain distance off the inverted-V guide 9b is notched. This notched-through portion 9d links via a switching mechanism to the charging part 14. Said switching mechanism consists of a switch plate 15 equipped with a through hole 15a at the specified position and of guides 14a, 14b for shifting said switch plate 15 in arrow direction of FIG. 5a. Said guides 14a, 14b have a seal 14c, 14d of prior art, said seal 14c, 14d serving to maintain the vacuum within the vapor deposition chamber 9. The charging part 14 is provided with a connection pipe 14f to be connected to a vacuum pump (not shown) of the prior art and with a connection pipe 14g for supplying the air to said charging part 14.

Under such arrangement, a good radiation heat reflector such as aluminum, copper, gold, silver is selectively introduced in the vaporizing element vessel 13 and the vapor deposition chamber 9 is evacuated by a vacuum pump (not shown) of prior art and maintained at a vacuum of $10^{-4} - 10^{-5}$ Torr. when the power supply E is closed, the heater 12 is heated and thereby a material held in the vaporizing element vessel 13 is vaporized. The evaporation temperature of an element to be vaporized is adequately set in relation to the degree of vacuum of vapor deposition chamber 9. Thus the evaporized element rises. Meanwhile, by a well known means the switch plate 15 is moved a specified distance along the guides 14a, 14b, say, in the right direction of FIG. 5a, causing the through hole 15a to be placed over the notched-through hole 9d. Thereby, the inside of the charging part 14 is held at practically the same vacuum degree as, say, in the vapor deposition chamber 9 and said charging part 14 holds a certain amount of grains 7 having clean surfaces degreased by picking and washing with water. Said grains 7 go through the through hole 15a and the notched-through hole 9d; fall along the inclined surface of the inverted-V guide 9b and the surfaces of said inclined plates 9a, 9a'; and via the discharge holes 9f, 9f' formed on the internal wall of the vapor deposition chamber 9 adjoining the bottom of said inclined plates 9a, 9a', they reach a delivery point (not shown). Said delivery point is kept by a known method at the same vacuum degree as the vapor deposition chamber 9. If the diameter of said notched-through hole 15a and the inclinations of said inverted-V guide 9b and said inclined plates 9a, 9a' are properly set, in said falling process the vaporizing element will be segregated around said grains 7 and a substantially homogeneous coat of the element will be formed on said grains 7. In order to make said grains 7 fall separately through said notched-through hole 9d and along said inverted-V guide 9b and said inclined plates 9a, 9a', it may be possible to provide, if necessary, a certain difference in the vacuum degree between the charging part 14 and the vapor deposition chamber 9. After vapor deposition treatment, the grains thus coated can be collected through an opened delivery point, (not shown) which is provided at the end of discharge hole 9f, 9f'; after collection of the grains, said delivery point is closed. Before grains are charged at the charging part 14 next time, the switch plate 15 is at first shifted to the left so that the notched-through hole 15a may come to be placed as shown in FIG. 5a, thereby said switch plate cutting off the vapor deposition chamber 9 from the charging part 14. Next, a vacuum state is created in the vapor deposition chamber 9; then by using the connection pipes 14g, 14f, the vacuum state of the charging part 14 is released; next, the lid 14e with hump-like section, of the charging part 14 is open by means of grip 14j formed on the top of the said hump and through this opening, said grains 7 are charged into the charging part 14. Thereupon, the lid 14e is put back to close; and using the connection pipe 14g, 14f, the vacuum degree in the charging part 14 is brought back to substantially the same degree in the vapor deposition chamber. Through repetition of this process, it is possible to build up around said grains 7 a coat of a material that will reflect the radiation heat.

In FIGS. 5a–c 10 is a leak cock, 11 is a vacuum gauge; and 14h is a seal of prior art which is provided along the periphery of the top surface of charging part 14.

In this case, the thickness of the coatings depends on the maximum reflection of radiation heat in relation to the diameter of the grains. When the diameter of grains 7 is, e.g., suitably, 0.1 mm to 1.2 mm, the preferable thickness of the coatings will be $0.1\mu$ to $1.2\mu$.

Figure 2B:
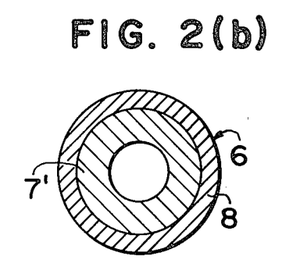

FIG. 2(b) illustrates an example of a hollow particle, particle 6. For the manufacture of hollow particle 6, the vacuum vapor deposition apparatus of FIG. 5 may again be used. First, a sphere with a specified diameter made of a material easy to dissolve at low temperatures, for instance, foamed polystyrene, is molded or formed. The sphere is set on charging part 14 in FIG. 5, while an element of low heat conductivity which is to constitute wall 7' of the hollow particle is placed in vaporizing element vessel 13. Then by heating filament 12, the vaporized element is deposited on the outer surface of the above-mentioned sphere, thereby forming wall 7' of the low heat conductivity element with an internal diameter corresponding to the specified diameter of the sphere. Then, in a manner similar to that previously described in relation to FIG. 2a, a material that effectively reflects radiation heat is provided around wall 7'. The particle thus prepared is dried and then heated to about 100° C, to dissolve the foamed polystyrene, leaving hollow particle 6. When the sphere is made of a material like foamed polystyrene which generates carbonic acid gas upon burning or dissolution, the resulting hollow particle will hold a sealed carbonic acid gas. If the hollow particle is exposed to a low temperature of, for example, below about 190° K, the carbonic acid gas will freeze, leaving a vacuum hollow grain that is extremely desirable for a heat insulation effect. The relation between the wall thickness and the coating thickness of the hollow particle is chosen within the limits that assure attainment of the objects of the present invention. For instance, if the diameter of the hollow particle as a whole is preferably 0.1 mm to 1.2 mm, the preferable thickness will preferably be 3 to 200μ for the wall and 0.1 to 1.2μ for the coating.

Figure 3A:
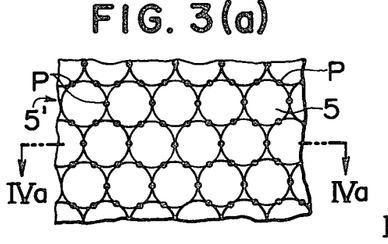
FIGS. 3a and b are plan views of blocks of heat insulating particles constituted with the particles respectively illustrated in FIGS. 2a and 2b.
Figure 3B:
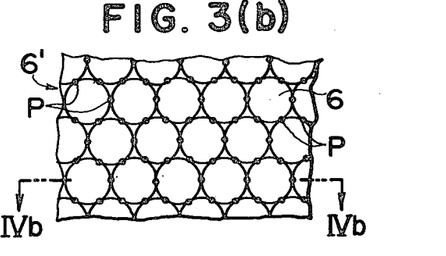
Figure 4A:
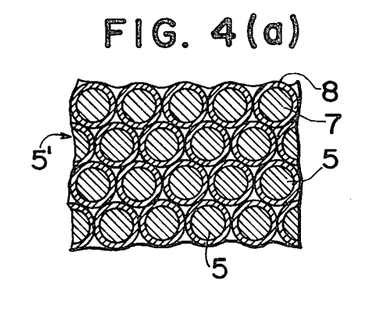
FIGS. 4a and b are sectional views at 4a—4a and at 4b—4b respectively of heat insulating particles illustrated in FIGS. 3a and 3b.
Figure 4B:
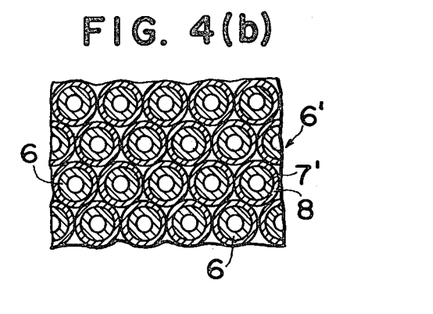

Particles 5 or 6, thus manufactured as illustrated in FIG. 2a or in FIG. 2b are bound together in a state of adjacent particles coming into point contact P at their surfaces with one another and molded into a rectangular cube of a certain thickness as illustrated in FIGS. 3a, b and 4a and b. To bind the particles together sintering methods are employed whereby the molecules of the metallic coating of the respective particles are dispersed in one another at the points of mutual contact to form a true molecular bond. Thus, when, for instance, a rectangular cube of bound particles is to be molded, said particles and 3 to 8 weight percent of a binder such as zinc stearate or parafin are placed in a metal mold with a shape matching a rectangular cube which is then heated for about 1-3 hours in a hydrogen or inert gas atmosphere in an electric furnace at a temperature sufficient to fuse the metallic surfaces at their point of contact. Thereupon, the binder evaporates and vanishes leaving the metallic surfaces of the particles sintered to one another in point contact.

Generally, it is sufficient to heat the coated particles to a temperature of about ⅔ the melting point of the metal forming the surface coating of particles in order to effect sintering of particles at their points of contact. Although the sintering procedure of the present invention produces a true molecular bond between the metallic coatings through dispersion of the metal molecules of the respective metal surfaces at their points of contact, it is important that contact be between the metallic coatings and not between the center grains themselves to avoid increase in thermal conduction.

FIGS. 3a and 4a and 3b and 4b respectively illustrate rectangular cubes 5', 6' of a certain thickness composed of particles 5 and 6 of FIGS. 2a and 2b as bound together. Either particles 5 or 6 can be bound together by the above described method.

The sintering method according to the present invention is illustrated as follows:

EXAMPLE 1 a) Composition of sintered particles:

|  | I | II |
| --- | --- | --- |
| Solid center grain | Alumina | Glass |
| Metallic coating | Copper | Silver |
| Diameter of center grain: | 0.1–1.2mm | 0.1–1.2mm |

-continued

|  | I | II |
| --- | --- | --- |
| Thickness of coating | 0.1–1.2μ | 0.1–1.2μ | b. Sintering method

Respective particles of Samples I and II and 3–8% zinc stearate were mixed together. Separate cylindrical molds, diameter 2cm, length 5cm, were packed full with these mixtures and using a plate, a small amount of pressure was exerted on the mold from the top. In consequence the particles stuck together with enough cohesion not to break loose. The molded particles thus obtained were carefully taken out of the mold and placed in a flowing atmosphere of 100% hydrogen. Then they were heated for about 2 hours at 720°–770° C, i.e., about equal to or slightly higher than ⅔ of 1083° C, which is the melting point for copper, when the coating was copper; and at 640°– 680° C, i.e., equal to or slightly higher than ⅔ of 960° C which is the melting point for silver, when the coating was silver. As the result, a cylindrical heat-insulator of the present invention was yielded which consisted of metallic coated particles sintered together at their points of surface contact.

EXAMPLE 2

Instead of zinc stearate as employed in EXAMPLE 1, 3–8% paraffin was employed. Particle composition was otherwise absolutely the same as in EXAMPLE 1.

As the result of experiment, a heat-insulator with the same properties as in EXAMPLE 1 was yielded.

EXAMPLE 3

Instead of the atmosphere of 100% hydrogen used in EXAMPLES 1 and 2, an inert gas atmosphere of 100% argon was employed. An effective heat-insulator according to the present invention was obtained.

EXAMPLE 4

The sintering of hollow center grains according to the present invention under absolutely the same conditions as with the solid ones was carried out and substantially the same results obtained as with the solid grains in EXAMPLES 1–3.

Figures 6A, 6B, 7:
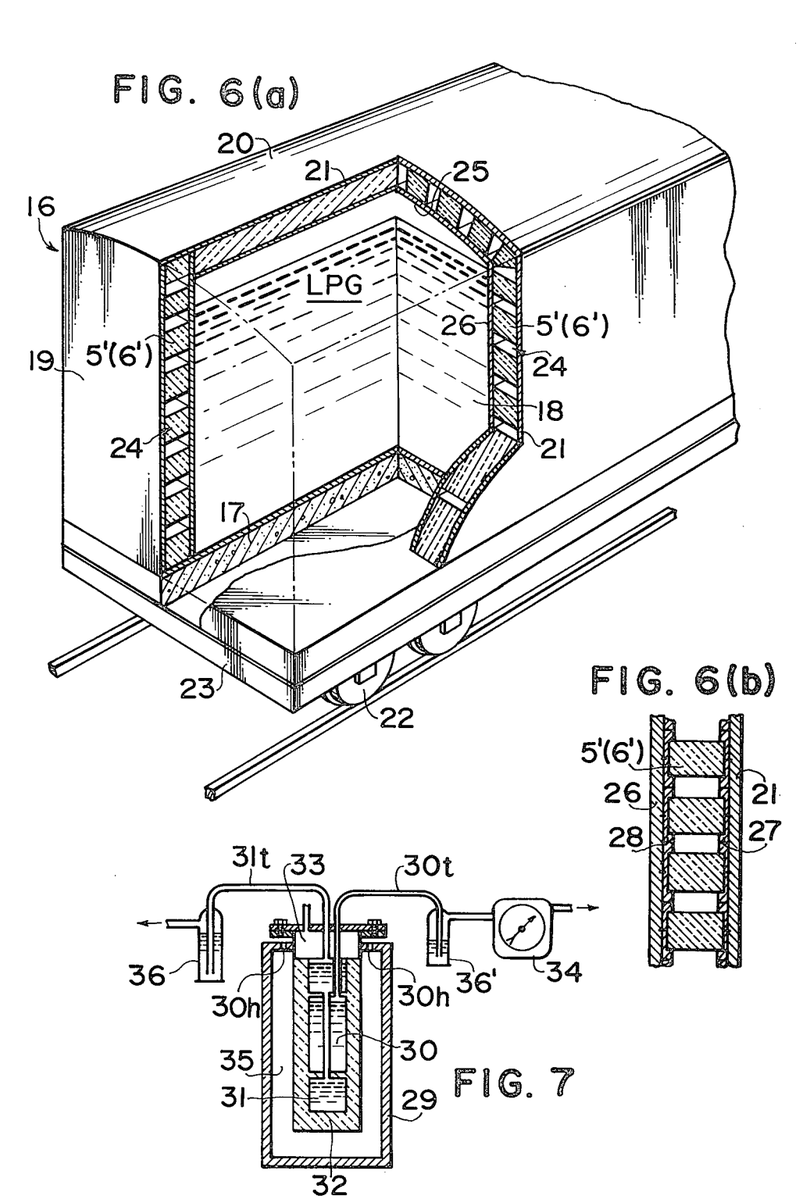

As illustrated in FIG. 6a, the heat insulator manufactured according to the present invention is applicable for the heat insulation of a vehicle to carry liquefied propane gas LPG which must be maintained at a temperature below at least −42.1° C. Numeral 16 is the vehicle, on truck bed 23 of which is mounted concrete bed 17 for receiving LPG holding room 18. On the inside wall 26 and the outside wall 21 of the sides of room 18 and between inside wall 25 and outside wall 20 of the roof thereof are provided heat insulating layers 24, in which are arranged at certain intervals blocks 5' or 6' of heat insulator particles 5 or 6 of the invention. Instead of being arranged in the form of the blocks shown in FIG. 6, heat insulator particles 5 or 6 may be provided in a form following the contour of the heat insulating layer 24. (Incidentally, 19 is the end surface of the vehicle 16; 22 is a wheel of the vehicle 16.)

Various methods are conceivable for fitting the formed heat insulator particles 5' or 6' between the inside and outside walls of the LPG holding room. For instance, as illustrated in FIG. 6b, insulator-fixtures 27 and 28 may be provided on the opposing surfaces of inside wall 26 and the outside wall 21 and the formed heat insulator particles 5' or 6' interposed and fixed therebetween. Desirably, fixtures 27 and 28 can also be the heat insulator of this invention.

The heat insulating effect can be further improved by evacuating the spaces in heat insulating layer 24 to a certain extent, thereby adding the advantage of the vacuum heat insulation of the prior art. If the heat insulator of this invention were placed in an atmosphere of carbonic acid gas, evacuation could still be carried out, subsequent to the freezing of the carbonic acid gas by maintaining the heat insulating layer at less than about 190° K. Further, in the case of the hollow particles of FIG. 2b, both interior and exterior vacuums can be achieved improving the heat insulating effect even more. If such particles contain carbonic acid gas at the time of installation, the aforesaid treatment of less than about 190° K in situ will effect the freezing of the gas and the creation of a vacuum.

The hollow or solid particles of this invention which form a heat insulator each possess a low heat conductivity. Moreover, the particles are bound together in a state of mutual point contact and the heat conduction takes place through the coating. Therefore, solid heat conductivity is extremely low. Further, the small gaps between the particles minimize the heat conduction through convection. Evacuation of the heat insulating layer in a heat insulator according to the present invention will further enhance the heat insulating effect. Since the particle surface is coated with a material subject to less heat radiation, the radiation heat can be dissipated to the utmost, thereby suppressing heat transfer.

Further, since the heat insulator according to the present invention is constituted of particles in cell structures, ample mechanical strength is assured. If hollow grains are used for the manufacture of particles, the heat insulator obtained will be extremely light. Even with the use of solid grains, the product turns out to be far lighter than one obtained using conventional heat-insulating particles.

Depending on the intended use of the heat insulating particles of the invention, it is possible to impart the particles with electrical conductivity, corrosion resistance or electrical insulating ability. Thus, if, for instance, a material of high electric conductivity such as gold, silver, aluminum or copper is adopted for coating the grains, the heat insulator obtained will possess a high electrical conductivity, because the insulator will represent an electrical connection of many particles each having a high electrical conductivity. If the coating material is stainless steel or titanium, the insulator obtained will be highly resistant to corrosion and if, for instance, a high molecular binder is employed for binding particles, the heat insulator will exhibit an electrical insulation capacity.

The coating formed around the grains is not confined to the single layer as illustrated in the embodiment of the invention, but may be a multiple coating.

Some of the results of experiments carried out to confirm the effects of the heat insulator according to the present invention are as follows:

1. Heat-conductivity test.
   1. Test setup and test procedure.

A test setup in the prior art as illustrated in FIG. 7 was adopted. In FIG. 7, 29 is the test assembly; 30, 31 are liquefied nitrogen-holding chambers, the chamber 30 being connected via a connection pipe 30t to the wet type gas meter 34 and the chamber 31 being connected via a connection pipe 31t to a gas exhaust hole (not shown); 32 is a vessel to hold the grains to be tested; the room 35 constituted by the inside wall of the test assembly 29 and outside wall of said vessel 32 to hold the grains to be tested is maintained at a constant temperature by a method in the prior art; and the room 33, being connected to a vacuum pump of prior art, is held in a vacuum state. Incidentally, 30h is a through hole, 36, 38' are water saturation chambers in FIG. 7. Under this arrangement, the outside wall and the outside bottom of said vessel 32 to hold the grains to be tested are in contact with the constant temperature room 35, while the top surfaces of said vessel 32 and liquefied nitrogen holding chamber 30, 31 are in contact with the vacuum chamber 33. Thus, by measuring the extent to which the temperature in the constant temperature room 35 around the vessel 32 is transmitted to the liquefied nitrogen-holding chamber 30, it is possible to determine the heat conductivity of said grains under test and, as is well known, this can be done by measuring the gas generated in the liquefied nitrogen holding chamber 30 by means of a gas meter 34 of prior art and converting the measured amount.

2. Test Piece.

The test piece consisting of solid glass beads coated with aluminum, its outer diameter being $200\mu$–$500\mu$ and its coating thickness $0.1$–$1.2\mu$. The vessel 32 was fully charged respectively with such beads of almost the same diameter as separated without being bound together.

On the other hand, for comparison of heat conductivity between the present invention and heat-insulating powder in the prior art, the vessel 32 was filled similarly with well-known heat insulator, that is, pearlite heat insulators and glass fibers.

3. Test results are as follows:

| Grains to be tested | Heat conductivity (microwatts/cm°K) |
| --- | --- |
| Pearlite heat-insulators | 5.5 – 63 |
| Glass fibers | 4.2 – 29.0 |
| Glass beads coated aluminum in accordance with the present invention. | 1.4 – 8.4 |

It has been confirmed that solid glass beads of 0.1mm–1.2mm in diameter coated to the thickness of $0.1$–$1.2\mu$ respectively with aluminum, silver, and nickel exhibit values of heat conductivity falling within the range in the above test results.

The same can be said about the heat-conductivity of hollow alumina grain coated respectively with aluminum, silver and nickel (outer diameter 0.1–1.2mm, wall thickness 3–$200\mu$, coating thickness $0.1$–$1.2\mu$ respectively).

2. Strength test.

Solid particles with an outer diameter $300\mu$ coating thickness $0.3\mu$ were taken as specimens and submitted to a crushing test with the following results:

| Particle | | Crushing Strength |
| --- | --- | --- |
| Grain | Coating | Kg/cm$^2$) |
| Glass beads | Aluminum | 215.5 |
| " | Silver | 125.4 |

As evident from the above, the heat insulator of the present invention has the following features:

1. Unlike the conventional foamed products, it does not pollute the atmosphere with foaming gas which replaces the air or other atmospheric gas, nor does it suffer a reduction in the heat insulating effect;

2. Unlike the high vacuum heat insulator, it suffers no heat invasion by solid heat conduction;

3. Unlike the conventional heat insulating powder, heat conduction is free from the influence of particle conditions with the reflection of radiation heat being quite good; and 4. Unlike the multi-layer heat insulator, the trouble of winding each layer is saved. Moreover, it possesses sufficient mechanical strength and can fully stand being used as a supporting or other constituent member of a structure or device.

The present invention thus provides excellent heat insulating particles which fully satisfy the three requirements of gas molecular heat conduction, heat radiation and solid heat radiation and further possess ample mechanical strength.

Various changes and modification as may be readily apparent to one skilled in the art may be made to the embodiments of the invention, disclosed hereinabove. For example, a heating insulating layer can be formed of both hollow and solid particles. This and other such changes and modifications are intended to be within the scope of the invention as defined by the appended claims.

What is claimed is:

1. A heat insulating, structurally stable body comprising a plurality of smooth heat insulating particles, each having a hollow center grain having an outside diameter of about 0.1 to about 1.2 mm, a wall thickness of about 3 to 200 $\mu$, and a heat conductivity of less than about $1 \times 10^4$ microwatts/cm°K, said hollow center grains further being of material selected from the group consisting of silica, alumina, glass, and a synthetic resin and coated thereon at a thickness of about 0.1 $\mu$ to about 1.2 $\mu$ with a metallic material selected from the group consisting of aluminum, copper, gold, silver, stainless steel and titanium and having a reflected heat radiation emittance value of greater than about 0.02 to 300° K, the metallic surfaces of said particles being bonded together by sintering in regularly arranged point contact relationships at their contacting surface at a temperature of about ⅔ the melting point of said coating.

2. A heat insulator according to claim 1 wherein the synthetic resin is nylon or Teflon.

3. A heat insulator according to claim 1 wherein said particles are bound together by sintering such that the outer metallic surfaces of adjoining particles are molecularly bonded at their points of mutual contact.

4. A heat insulator according to claim 3 wherein the adhered particles form a plurality of block-like members which are arranged at intervals separated by vacuum spaces.

5. A heat insulator according to claim 3 wherein the adhered particles form a plurality of block-like members which are arranged at intervals separated by spaces containing carbonic acid gas.

* * * * *